(No Model.)

S. P. CRAFTS.
BRICK KILN.

No. 355,387. Patented Jan. 4, 1887.

WITNESSES:
George L. Barnes.
David K. Andrews.

INVENTOR
Samuel P. Crafts.
BY
Julius Twiss.
ATTORNEY

UNITED STATES PATENT OFFICE.

SAMUEL P. CRAFTS, OF HAMDEN, CONNECTICUT.

BRICK-KILN.

SPECIFICATION forming part of Letters Patent No. 355,387, dated January 4, 1887.

Application filed September 13, 1886. Serial No. 213,452. (No model.)

*To all whom it may concern:*

Be it known that I, SAMUEL P. CRAFTS, a resident of the town of Hamden, in the State of Connecticut, have invented new and useful Improvements in Burning Brick, of which the following is a specification.

My invention has for its object to provide means for facilitating and perfecting the combustion of the fuel in brick-kiln furnaces, and for oxidizing and coloring the brick while being burned.

The invention consists in a novel method or process of introducing a volume of steam into the products of combustion within the kiln, as hereinafter more fully described and claimed.

Figure 1:
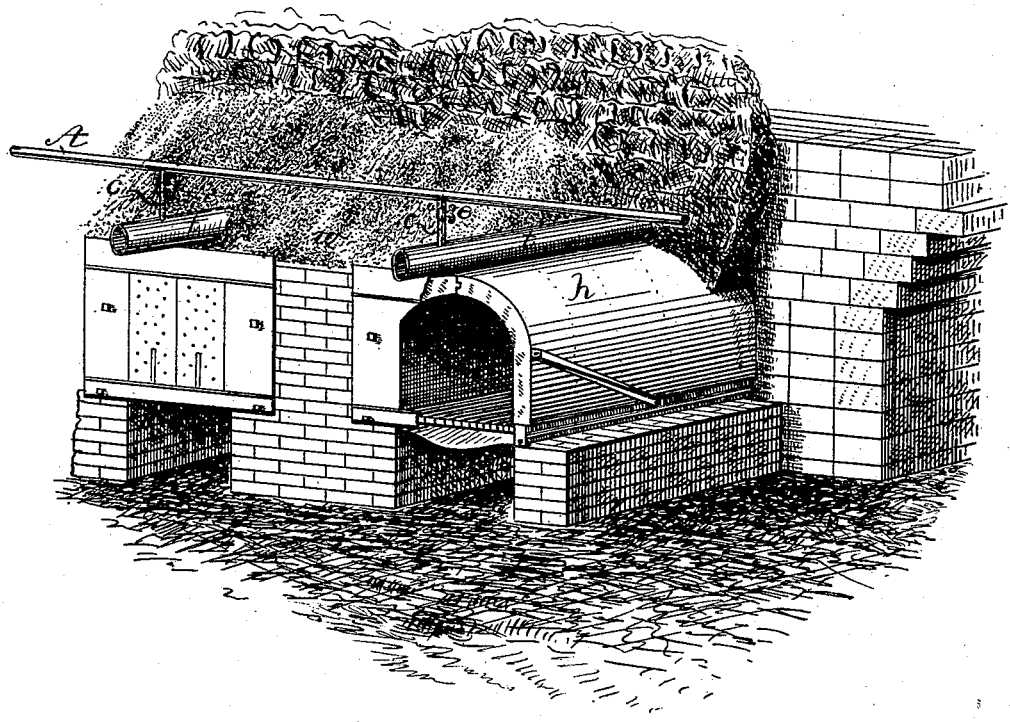
Figure 2:
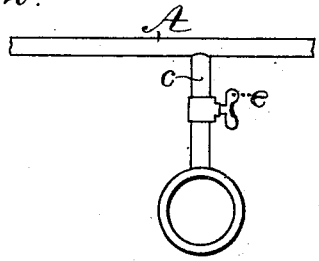

In the accompanying drawings, Figure 1 is a perspective view of a series of brick-kiln furnaces embodying my invention, and showing the method of its application; and Fig. 2 shows an enlarged view of part of the details of Fig. 1.

This invention is especially adapted for use in connection with the portable brick-kiln furnace for which Letters Patent of the United States No. 337,927 were granted to me March 16, 1886, and which consisted of the series of U-shaped arches $h$, made of fire-clay, and arranged upon an iron base or grate-frame, and having an air-tube, $t$, above the arches communicating with the peak of the kiln, the arches and tubes being buried under a bank of earth, sand, or loam, $w$, to prevent the radiation of heat.

In this furnace the sand contiguous to the arches and around the tube $t$ becomes heated, and the tubes deliver a current of hot air into the peak of the arch for the purpose of facilitating and perfecting the combustion of the heated gases within, and also giving a deeper red color to the bricks. To further perfect the combustion of the fuel-gases, and to color the brick a deeper red by increased oxidization and heat, I introduce a stream of water into the air-tube $t$, where it is converted into steam by the high temperature of the tube, which then passes into the arch of the kiln and is decomposed by the union of its oxygen with the hot carbon products resulting from the combustion of the fuel while the freed hydrogen is burned.

This process adds to the economy of the furnace by consuming the carbon compounds which are not burned in the combustion-chamber, and which would otherwise escape, and also by supplying an extra source of combustion and heat in the hydrogen produced by the decomposition of the water-vapor. A portion of the oxygen liberated by the decomposition of the water assists in the oxidization of the iron in the sand and clay of which the bricks are formed, thereby producing a deeper or darker red color in the bricks when burned. A portion of the hydrogen liberated by the decomposition of the vapor reunites with the oxygen from the air in the kiln and reproduces a vapor in the upper portion of the kiln, which acts as an enveloping-blanket and serves to retain the heat in the mass of burning bricks, and thus maintain them at a higher temperature.

Any convenient method of introducing the water-vapor into the kiln may be employed; but the means shown in Fig. 1 of the drawings is preferred.

A pipe, A, is extended along the kiln over the air-tubes $t$, near their outer ends, and connected with each of them by short vertical branch pipes, $c$, in which a stop-cock, $e$, is placed. The longitudinal pipe A is connected with a reservoir, from which a constant supply of water is conducted to the air-tubes. The supply of water to each furnace is regulated and controlled by the stop-cocks $e$ and fed to the furnace as required.

A separate reservoir of water can be mounted over each furnace and provided with means for conducting a drip into the air-tube, each independent of the other, throughout the system; but the means shown is preferable when a large number of furnaces are used in the series.

The tubes may be made of various shapes and materials, and may be formed in sections or entire, with the outer ends wholly or partly open, as required.

I claim as new and desire to secure by Letters Patent—

1. The combination, with a series of brick-kiln furnaces, each having a heated air-tube communicating with the peak of a fire-arch, of means, substantially as described, for conducting water into the heated air-tubes, thereby generating water-vapor to facilitate the combustion of the carbon compounds within the fire-arches, substantially as and for the purpose described.

2. The combination, with a series of brick-kiln furnaces, each having a heated air-tube communicating with the peak of a fire-arch, of a conduit connected with a reservoir of water and connecting with each tube by means of a branch pipe provided with a stop-cock to regulate the flow of the water into the air-tube, substantially as described.

SAMUEL P. CRAFTS.

Witnesses:
 JULIUS TWISS,
 DAVID K. ANDREWS.